July 26, 1927.
W. M. SHEEHAN
1,636,840
ELECTRIC LOCOMOTIVE TRUCK
Filed June 9, 1926   2 Sheets-Sheet 1
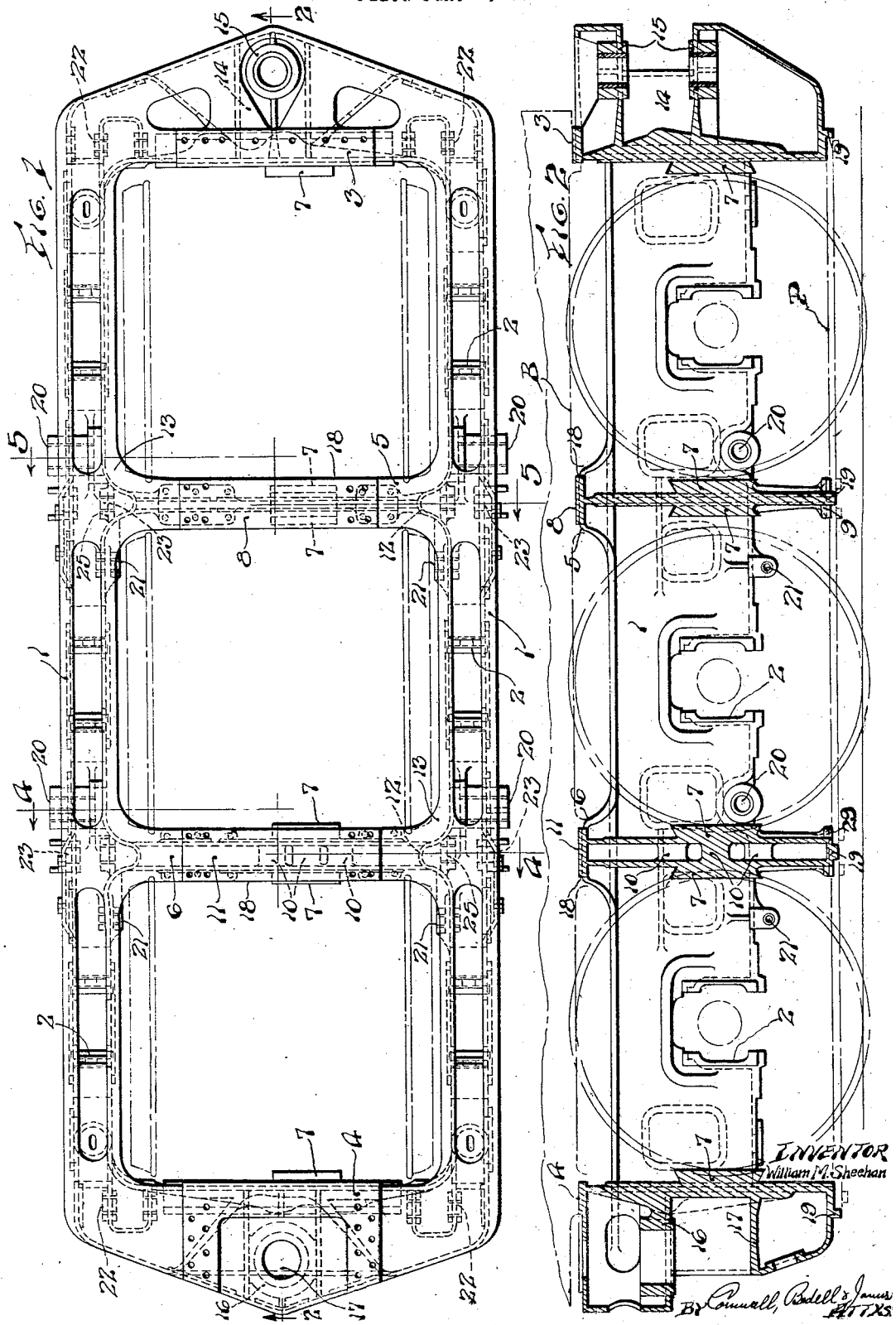
INVENTOR
William M. Sheehan
By Connell, Bidell & James
ATTYS July 26, 1927.  
W. M. SHEEHAN  
ELECTRIC LOCOMOTIVE TRUCK  
Filed June 9, 1926  
1,636,840  
2 Sheets-Sheet 2
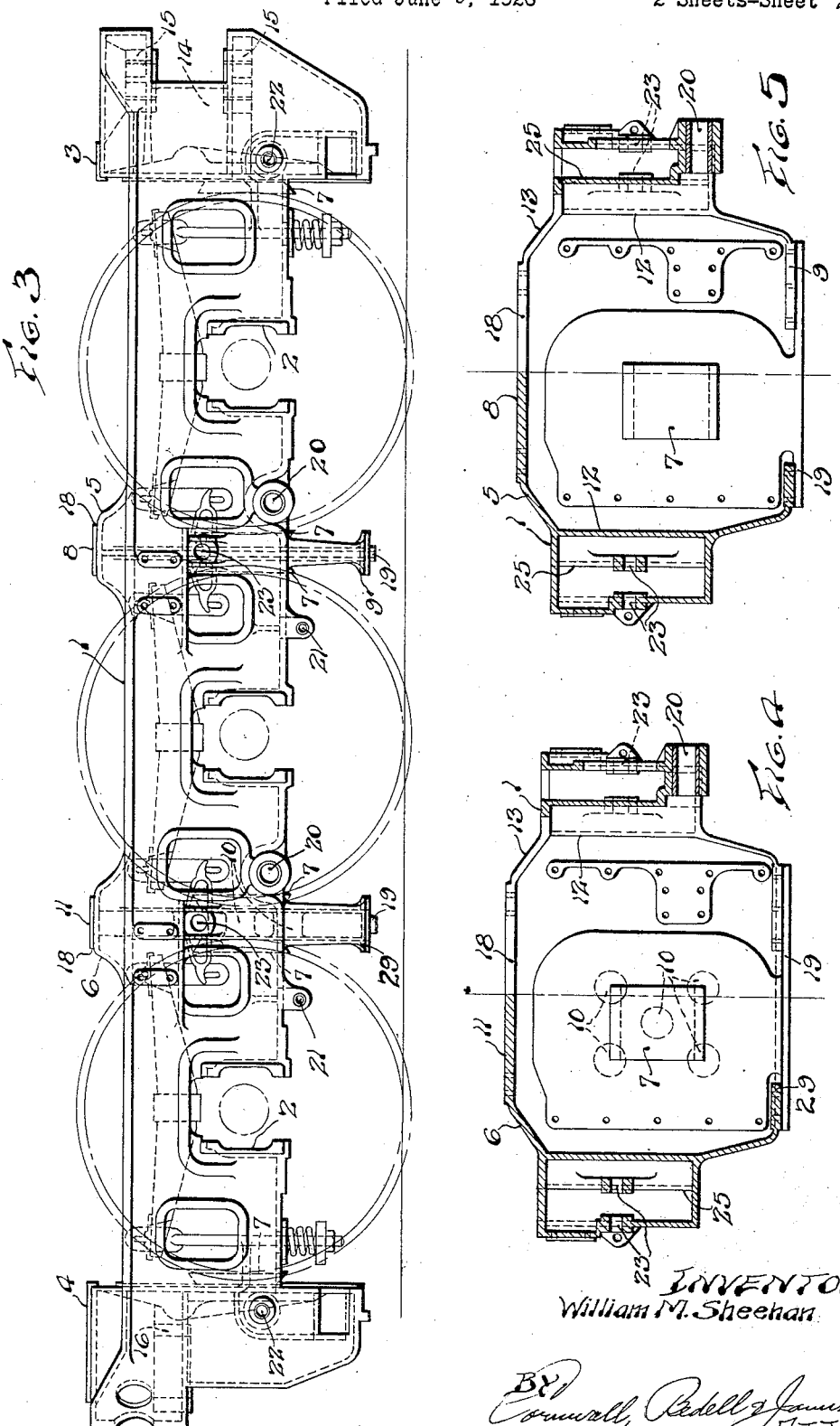
INVENTOR  
William M. Sheehan Patented July 26, 1927.

1,636,840

UNITED STATES PATENT OFFICE.

WILLIAM M. SHEEHAN, OF ST. LOUIS, MISSOURI, ASSIGNOR TO COMMONWEALTH STEEL COMPANY, OF GRANITE CITY, ILLINOIS, A CORPORATION OF NEW JERSEY.

ELECTRIC LOCOMOTIVE TRUCK.

Application filed June 9, 1926. Serial No. 114,744.

My invention relates to railway rolling stock and consists in an improved truck construction particularly adapted for use under electric locomotives.

The object of my invention is to provide a truck frame, or cab underframe, for use with gearless or bi-polar motors having their armatures wound on the driving axles, the parts preferably being formed integrally and including pole pieces for the motors and various other elements usually made separately from the frame and assembled therewith. By making a large number of elements in one unit, preferably in the form of one piece casting, the labor and expense of assembly is eliminated, the possibility of the loosening of attaching means for separate members and the need for frequent inspections and repairs is reduced. In addition to these advantages the integral construction produces a more compact structure and one less expensive than a built-up structure.

In the accompanying drawings which illustrate a selected embodiment of my invention:—

Figure 1 is a top view of a frame embodying my invention.

Figure 2 is a longitudinal vertical section taken on the center line 2—2 of Figure 1.

Figure 3 is a side elevation of the frame.

Figures 4 and 5 are vertical transverse sections taken on lines 4—4 and 5—5 respectively of Figure 1.

The frame includes sides or wheel pieces 1 each of which is box-shaped in cross section and has pedestals 2 for the axle journal boxes. These wheel pieces are connected at their ends by rails 3 and 4 and are connected intermediate their ends by cross ties 5 and 6.

Each of the above mentioned transverse members has pole pieces 7 formed integrally thereon, the end rails having pole pieces on their inner faces only, and the intermediate cross ties having pole pieces on both faces. Cross tie 5 is shown as having a single web with reenforcing flanges 8 and 9 at top and bottom which form brackets for mounting the cab base B and tie plates P, respectively. Cross tie 6 is shown as being a box section, there being transverse elements 10 connecting the side walls of the cross tie between the pole pieces 7, the sections 10 being of sufficient area to conduct the magnetic flux or current from one pole to the other. The top and bottom of cross tie 6 includes flanges 11 and 29, respectively corresponding to the flanges 8 and 9 on cross tie 5.

I show the inner wall of each wheel piece 1 as extending inwardly and outwardly as indicated at 12 to form a U-shaped connection with the webs of the cross ties which relieves manufacturing and service stresses. Each of the cross ties extends inwardly and downwardly below the level of the wheel piece or side of the frame and its cab base supporting flanges are suitably connected with the upper wall of the wheel pieces by arcuate gussets 13.

The end rail 3 has a radius bar pocket 14 and pin fulcrum elements 15 formed integrally thereon and the opposite end rail 4 has its outer faces provided with a bracket 16 forming an articulated connection element. A horizontal wall 17 below bracket 16 is adapted to prevent undesirable disengagement of the cooperating element of the adjacent truck. Each of the transverse members of the frame has integral lugs 18 and 19 forming shear lips for the cab base and for the bottom tie plates respectively. Other integral elements of my frame are the brake lever fulcrums 20, the dead lever fulcrums 21, the brake hanger fulcrums 22 and the equalizer fulcrums 23 which are alined with the cross ties and are formed in the outer wall of the wheel pieces 1 and in a rib 25 provided on the inside of the wheel piece in front of the U-shaped bends 12.

I claim:

1. An electric locomotive truck frame transverse member, box-shape in cross section and having pole pieces formed on its outer walls, there being connections between said walls adjacent to said pole pieces of sufficient cross sectional area to conduct the magnetic flux from one of said pole pieces to the other.

2. A one piece casting comprising an electric locomotive truck frame having box shaped wheel pieces, and a cross tie between said wheel pieces, the inner walls of said wheel pieces having U-shaped bends extending inwardly of the frame to meet said cross tie.

3. A one piece casting comprising an electric locomotive truck frame and including wheel pieces, cross ties between said wheel pieces adapted to receive a motor frame between them, and pole pieces on said cross ties.

4. A one piece casting comprising an electric locomotive truck frame having integral wheel pieces, pedestals and a cross tie with pole pieces thereon, and equalizer fulcrums on said wheel pieces in line with said cross tie.

5. In an electric locomotive truck frame, wheel pieces and end rails connecting said wheel pieces, there being a pole piece formed integrally on the inside face of each of said rails, and integral draft pocket forming elements on the outside of each of said rails.

6. A one-piece cast truck frame for electric locomotives with wheel pieces comprising the sides of the frame, a tie member connecting said wheel pieces and extending above and below the level of said wheel pieces, the top and bottom of said tie member having integral brackets with shear lips formed thereon for mounting and positioning the locomotive cab base and for the truck bottom tie plates, respectively.

7. A one piece casting comprising an electric locomotive truck frame including wheel pieces, pedestals, cross ties, end rails with draft pockets, brake lever and hanger brackets, there being integral pole pieces provided on said cross ties and end rails.

In testimony whereof I hereunto affix my signature this 3rd day of June, 1926.

WILLIAM M. SHEEHAN.